United States Patent [19]

Von Holdt

[11] Patent Number: 4,706,926
[45] Date of Patent: Nov. 17, 1987

[54] SAFETY MOLD LIFT LOCK

[76] Inventor: John W. Von Holdt, 6864 Lexington La., Niles, Ill. 60648

[21] Appl. No.: 928,902

[22] Filed: Nov. 8, 1986

[51] Int. Cl.$^4$ .................. B29C 33/20; B29C 45/64; B29C 51/38
[52] U.S. Cl. .................................. 249/169; 72/470; 164/341; 425/151; 425/192 R; 425/595; 425/451; 425/451.9
[58] Field of Search ............... 425/192 R, 450.1, 451, 425/451.5, 451.6, 595, 151; 249/163, 165, 166, 167, 168; 72/456, 462, 470; 164/341

[56] References Cited

U.S. PATENT DOCUMENTS

| 3,909,180 | 9/1975 | Von Holdt | 425/450.1 |
| 4,004,448 | 1/1977 | Von Holdt | 72/462 |
| 4,487,564 | 12/1984 | Von Holdt | 425/451.9 |

FOREIGN PATENT DOCUMENTS 671066 4/1952 United Kingdom ............... 249/167

Primary Examiner—Willard E. Hoag
Attorney, Agent, or Firm—Charles F. Pigott, Jr.

[57] ABSTRACT

A mold comprising mold halves separable along a parting line has a rotating lifting handle carried by one of the mold halves, where the handle rotates between a first position in which it lies generally flat against the mold and a second position in which it extends outwardly from the mold to permit engagement by a lifting hook or the like. By this invention, rotation of the lifting handle from the first to the second position is prevented when the mold halves are separated along the parting line by more than a predetermined distance. Thus the mold cannot be lifted, since the handle cannot be rotated into outwardly extending position to receive the hook until the mold is closed. Additionally, this invention may be used to prevent opening of the parting line between the mold halves when in closed relation, while the handle is in the second position. Thus, the only time that the handle can be used to lift the mold is when it is closed and locked, to prevent accidental separation of the mold halves during lifting.

15 Claims, 8 Drawing Figures

SAFETY MOLD LIFT LOCK

BACKGROUND OF THE INVENTION

In Von Holdt U.S. Pat. Nos. 3,909,180; 4,004,448, and 4,487,564, various systems are disclosed for retaining multiple piece molds and dies together while they are being lifted or otherwise manipulated. Additionally, in Von Holdt U.S. application Ser. No. 904,618, filed Sept. 8, 1986 and entitled Mold Pin Lock, another system is disclosed in which the application of a hook to a closed pair of mold halves at its lifting site prevents the opening of the mold until the hook is removed.

Molds and dies are often large and heavy. Accordingly, potentially severe accidents can take place, for example, while a mold is being lifted, when the user has forgotten to secure the mold pieces together in some manner. n that situation, one of the mold pieces which is not in contact with the lifting hook can slip loose and fall to the floor. The damage to the mold or die can result in thousands of dollars. Additionally, the consequences can be fatal if a person is struck by such a large piece of steel.

In accordance with this invention, another improved safety lock system is provided for molds, dies, and equivalent devices, which are contemplated to be broadly included in the term "mold". By this invention, a mold can exhibit a fail safe aspect, in which a rotatable lifting handle cannot be rotated into its outwardly extending position, for engagement by a hook, unless the mold halves are properly closed. Additionally, the very act of rotating the lifting handle outwardly serves to lock the closed mold halves together, which locking is not released until the lifting handle is again rotated to its non-usable position, in which it is not outwardly extending, but lying against the mold.

Thus, in an industrial operation, the safety of the shop can be significantly improved, since it is not possible to lift the mold by means of its lifting handle unless it is properly closed, and the lifting handle cannot be put into a position to receive a lifting hook without locking the mold.

Accordingly, by this invention, workers in the shop cannot make a mistake in the lifting and other manipulation of a mold to cause accidental opening, as long as they are making use of the lifting ring or handle carried on the mold. Thus, greater assurance of safety is provided.

DESCRIPTION OF THE INVENTION

The invention of this application relates to a mold (including equivalent structures as previously defined) which comprises mold halves separable along a parting line and a lifting handle carried by one of the mold halves. The handle is rotatable between a first position in which the handle lies generally flat against the mold and a second position in which the handle extends outwardly from the mold, to permit engagement by a lifting member such as a hook on a cable or chain.

In accordance with this invention, first means prevents rotation of the lifting handle from the first to the second position when the mold halves are separated along the parting line by more than a predetermined distance. Additionally, it is preferred for added means to be provided for preventing opening of the parting line between the mold halves in closed relation when the handle is in the second position.

Typically, the first means may include a mount, carried in a recess of the one mold half referred to above, such mount rotatably holding the lifting handle. The mount is movable inwardly and outwardly between an inner and an outer position relative to the one mold half. Second means are positioned in a manner controlled by the position of the other mold half, the second means preventing the mount from occupying its outer position when the other mold half is separated from the one mold half. Third means are provided for preventing the lifting handle from rotating to its second position except when the mount is in its outer position.

The second means may include a first pin which is secured to the other mold half. A second pin is carried in the one mold half in longitudinally slidable relation, to permit longitudinal movement between first and second positions. The mount is then prevented from movement to its outer position when the second pin is in its first position. However, the mount is permitted to move to its outer position when the second pin is in its second position. Means are then provided for biasing the second pin toward its first position, while the first pin pushes the second pin into the second position when the mold halves are closed together, but the first pin permits the second pin to occupy its first position when the mold halves are separated by more than the predetermined distance referred to above. Such predetermined distance may typically be on the order of a sixteenth of an inch or so, so that the parting line between the molds may, if desired, open up to about a sixteenth of an inch without the locking effect described above taking place.

The first and second pins may be secured to their respective mold halves, but may define free ends that are normally in abutting relation within a transverse aperture defined in the mount. The second pin may define a diameter adjacent its free end of less than that of the transverse aperture. The second pin also may define a transversely-enlarged shoulder, spaced from its free end, which fits within the transverse aperture in the first position of the second pin, which serves to prevent the mount from moving to its outer position as long as the shoulder occupies the aperture.

The shoulder may be positioned out of the aperture in the second position. ln this circumstance, the mount may move to its outer position, with the diameter of free end being small enough to permit this to take place.

To provide the desired added means for preventing opening of the parting line between the mold halves in closed relation, the first pin and the transverse aperture may define interlocking means to prevent withdrawal of the first pin from the aperture while the mount occupies its outer position. Thus the mold halves are locked together in that circumstance.

Additionally, the lifting handle may define noncircular, arcuate, rotatable bearing surface means which typically acts against the one mold half which carries the lifting handle. The shape of the bearing surface means is proportioned to cause the mount to be moved to its outer position as the lifting handle rotates to its outwardly extending position. This is accomplished by causing that portion of the rotatable surface means which acts against the one mold half as the handle is extending outwardly to be of greater radius than that portion of the rotatable bearing surface means which acts against the one mold half as the handle moves toward its first position of lying generally flat against the mold. Thus, as the handle is rotated outwardly, the mount is urged toward its outer position. However, in the circumstances described above, when the mold is open it is not possible for the mount to move toward its outer position; thus the handle cannot rotate outwardly.

Hence, by the invention of this application, a fail-safe mold is provided in which the lifting handle cannot rotate outwardly into a position permitting its use for lifting unless the mold is closed. Additionally, the mold may be adapted so that the handle cannot be in its second, outwardly extending position to permit engagement with a hook for lifting without locking the mold halves together.

DESCRIPTION OF SPECIFIC EMBODIMENT

Figure 1:
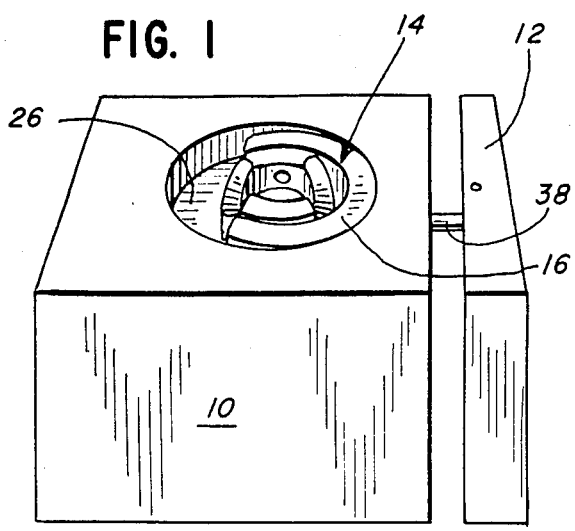
FIG. 1 is a perspective view of a mold in accordance with this invention, showing the two mold halves in a separated position.
Figure 2:
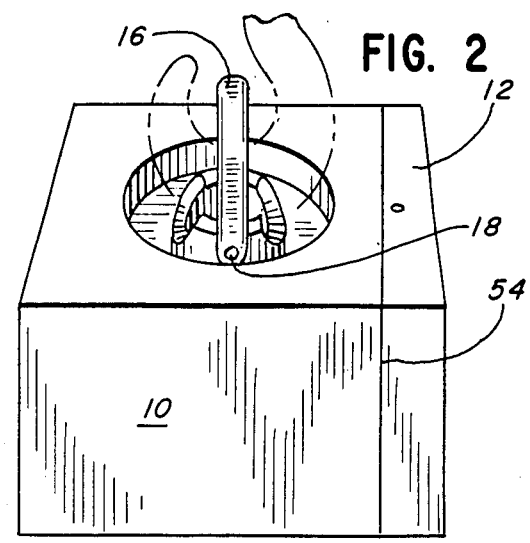
FIG. 2 is a perspective view of the mold of FIG. 1 showing the two mold halves in closed position, in physical contact along their parting line, and with the lifting hook in its second, outwardly extending position for use in lifting, which serves to lock the mold halves together.

Referring to FIGS. 1 and 2, a mold is shown comprising a pair of mold halves 10, 12, and a rotatable lifting handle 14. The mold and its lifting handle may be of generally conventional design except as otherwise described herein, having as desired a conventional molding chamber, sprue inlet, cooling channels, knockout pins, apparatus for opening and closing the mold, and the like. Additionally, as previously stated, dies or other large, equivalent apparatus may be modified in accordance with this invention.

Figure 3:
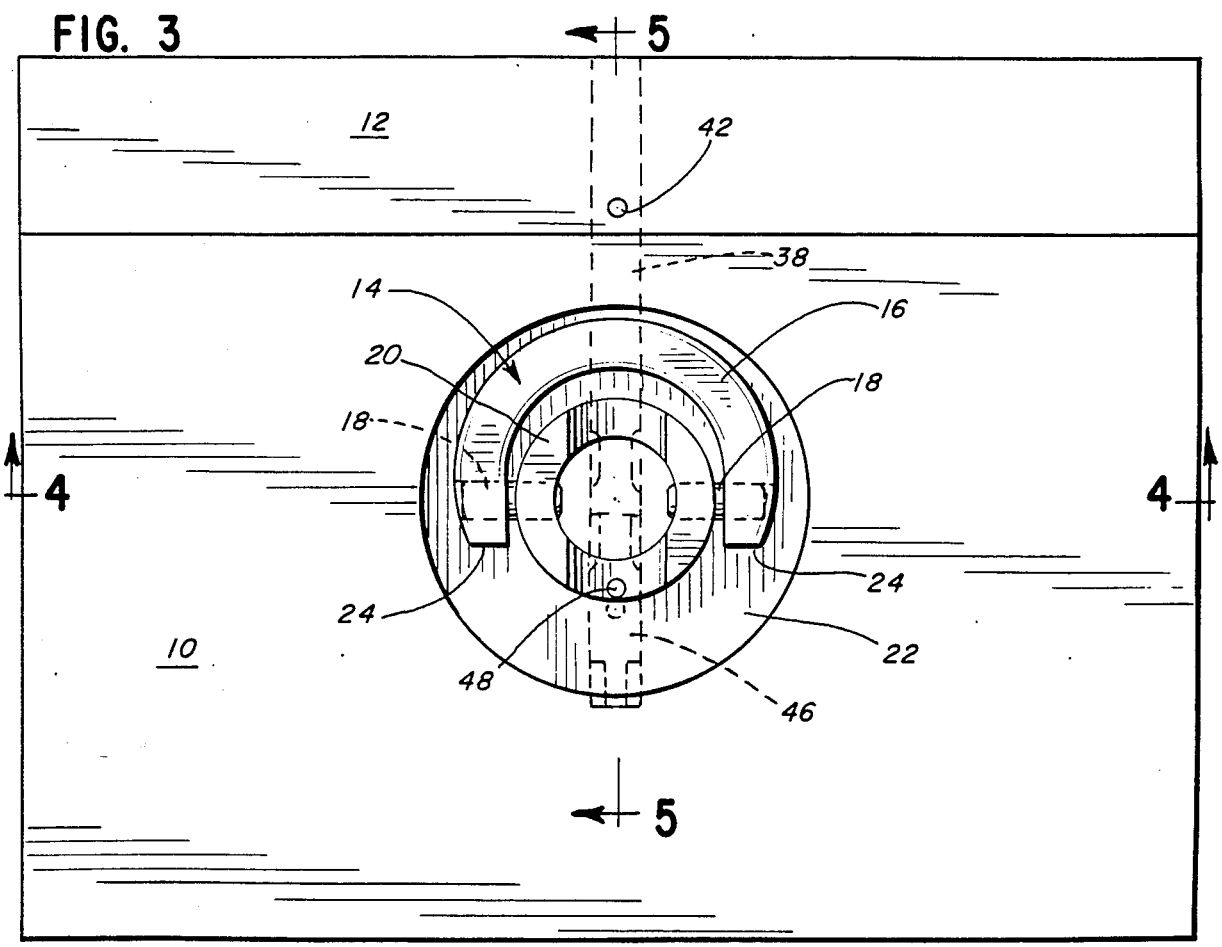
FIG. 3 is a plan view of the mold of FIG. 1, but shown in closed position.
Figure 4:
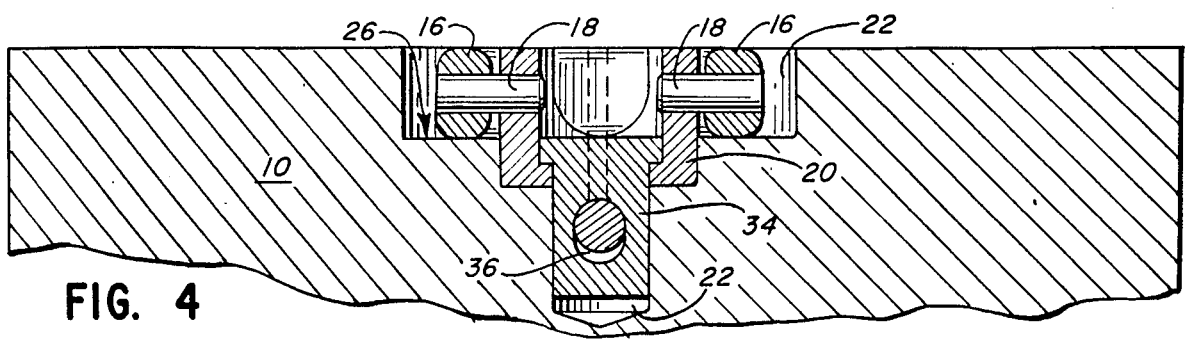
FIG. 4 is a sectional view taken along line 4—4 of FIG. 3.

Lifting handle 14 may include, as specifically shown, a C-shaped handle member 16 which is mounted on a pair of pivots 18. Pivots 18, in turn, are carried by bracket 20 which is mounted in recess 22 of mold half 10, as shown in FIGS. 3 and 4.

Figures 5, 6, 7, 8:
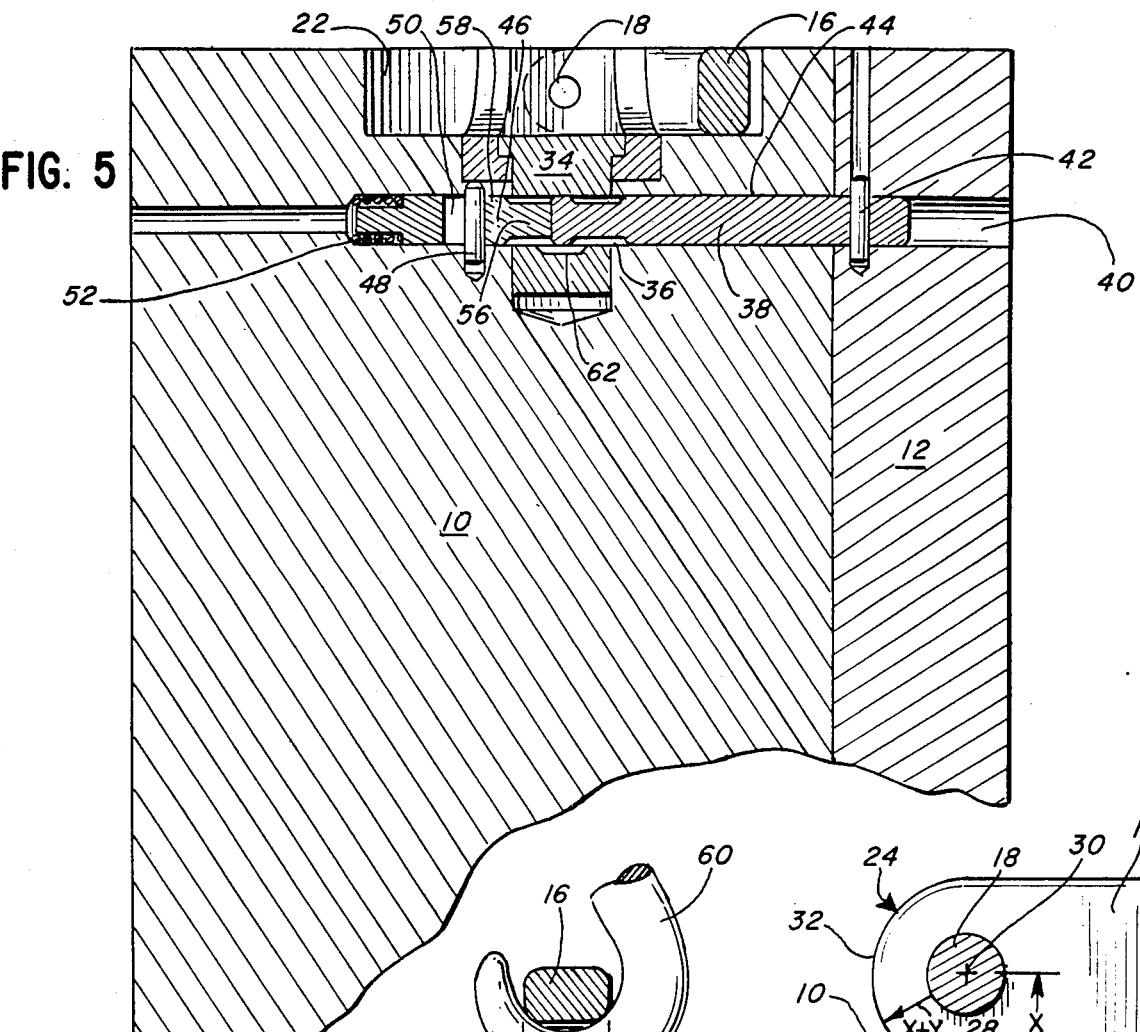
FIG. 5 is a sectional view taken along line 5—5 of FIG. 3.
FIG. 6 is a sectional view similar to FIG. 5, but showing the lifting handle and mount in lifting mode.
FIG. 7 is a sectional view similar to FIG. 5, but showing the configuration of the mold when the parting line is open and the mold halves separated.
FIG. 8 is a fragmentary, sectional view showing a portion of the lifting handle and the noncircular, arcuate, rotatable bearing surface means.

Handle member 16 defines at each end a noncircular, arcuate, rotatable bearing surface 24, shown in detail in FIG. 8. There, handle 16 is shown to be in its first position, lying flat against mold half 10, positioned in recess 22.

Bearing surface 24 is shaped so that an extremity 28 of bearing surface 24, which contacts the surface of mold half 10 when a handle member 16 is in its first, flat-lying position, is separated from the center of rotation 30 of handle member 16 by a certain distance X. The curved surface of bearing structure 24 is noncircular, but rather extends outwardly from point 28 with an increasing radius (X+Y) from center of rotation 30 to a typically maximum radial distance at point 32. As the result of this, when handle member 16 rotates outwardly into its second position, lifting handle assembly 14 is forced outwardly relative to mold half 10 as shown particularly in FIG. 6. This not only includes lifting handle 16, but it also includes bracket 20 and mount 34, which are connected to handle member 16, as particularly shown in FIG. 4.

Thus, mount 34 moves to its outer position when handle member 16 pivots to its second, outwardly extending position (FIG. 6), while mount 34 can fall back to its inner position, relative to mold half 10, when handle 16 assumes its first position, lying again generally flat against mold half 10.

Mount 34 defines a transverse aperture 36, through which pin means, carried by each mold half, extend.

First pin 38 is carried by mold half 12, being secured in bore 40 by retaining pin 42, and extending through aperture 44 to terminate within transverse aperture 36 of mount 34.

Second pin 46 is carried in mold half 10 by retaining pin 48, which is slideable in longitudinal slot 50, to permit second pin 46 to be longitudinally slideable between first and second positions as respectively illustrated in FIGS. 7 and 5. A coil spring 52 biases pin 46 toward its first position as shown in FIG. 7.

When mold halves 10, 12 are separated from each other along parting line 54, first pin 38 is withdrawn relative to mold half 10, as shown in FIG. 7. This permits spring 52 to advance second pin 46 to the position shown, in which second pin 46 occupies its first position, which prevents mount 34 from moving to its outer position (such outer position being shown, for example, in FIG. 6). This prevention takes place, because, while second pin 46 defines a section 56 adjacent its free end which is of less diameter than the diameter of aperture 36, it also defines a transversely enlarged, annular shoulder 58, spaced from the free end by section 56, which fits within aperture 36 snugly enough to prevent mount 34 from moving to its outer position. Thus, whenever mold half 12 has withdrawn by a predetermined distance from mold half 10, second pin 46 is advanced to push shoulder 58 into aperture 36, thus preventing mount 34 from rising to its outer position. This, in turn, as previously described with respect to FIG. 8, prevents handle member 16 from pivoting outwardly to its second position, when mount 34 is prevented from moving outwardly with respect to mold half 10.

Accordingly, in all circumstances where mold halves 10 and 12 are spaced away from each other by more than the predetermined distance, handle member 16, in its recess 22, cannot be engaged by a hook 60 to lift the mold assembly.

However, referring particularly to FIG. 6, when parting line 54 is closed between mold halves 10, 12, first pin 38 is positioned to push second pin 46 to its rearward position. In that position, annular shoulder 58 of second pin 46 no longer occupies aperture 36 of mount 34, so that mount 34 is free to rise to its outer position. Accordingly, handle member 16 can be rotated outwardly in a manner previously described to engage a hook 60, the action of which causes mount 34 to rise to its outward position.

As this takes place, means are provided for preventing opening of the parting line between the mold halves, as long as handle member 16 remains in its outward position. This is accomplished by the fact that first pin 38 and transverse aperture 36 define interlocking means which are activated by the outward moving of handle member 16.

Specifically, lateral aperture 36 is shown to define a recess 62 on its inner surface, while first pin 38 defines an enlargement 64 adjacent its end. In the locked position of mold halves 10, 12, as mount 34 moves outwardly, recess 62 and enlargement 64 enter into engagement which prevents the withdrawal of first pin 38 out of the interlocking relation. Thus, mold halves 10, 12, are locked together as long as handle member 16 remains in its outward position.

It can be seen that enlargement 64 is, in this particular embodiment, only a relative enlargement, being defined by reduced diameter portion 66 of first pin 38, this being sufficient to provide the desired interlocking function. It can also be seen that the proportions and shapes of the various parts can be varied in a wide variety of ways to achieve, in accordance with this invention, the desired means for preventing rotation of the lifting handle from the first to the second position when the mold halves are separated along the parting line by more than a predetermined distance, and also for providing the means for preventing opening of the parting line between the mold halves in closed relation when handle 16 is in the second, outwardly extending position.

As a result of the above, a multiple piece mold is provided in which separable mold portions, and specifically mold halves, may be safely lifted together by means of the invention of the application. While the term "mold halves" has been used, the term is not intended to exclude modifications wherein multiple parting lines between three or more separable mold portions are lockable together in accordance with the principles of this invention.

The above has been offered for illustrative purposes only, and is not intended to limit the scope of the invention of this application, which is as defined in the claims below.

That which is claimed is:

1. In a mold comprising mold halves separable along a parting line, and a lifting handle carried by one of said mold halves, said handle being rotatable between a first position in which the handle lies generally flat against the mold and a second position in which the handle extends outwardly from the mold to permit engagement by a lifting member, the improvement comprising, in combination: first means preventing rotation of said lifting handle from the first to the second position when the mold halves are separated along said parting line by more than a predetermined distance.

2. The mold of claim 1 which includes added means for preventing opening of the parting line between said mold halves in closed relation when said handle is in the second position.

3. The mold of claim 1 in which said first means includes a mount carried in a recess of said one mold half, said mount rotatably holding said lifting handle, said mount being movable inwardly and outwardly between an inner and an outer position, relative to said one mold half, and second means positioned in a manner controlled by the position of the other mold half, said second means preventing said mount from occupying its outer position when the other mold half is separated from the one mold half, and third means preventing said lifting handle from rotating to its second position except when the mount is in its outer position.

4. The mold of claim 3 in which said second means includes a first pin secured to said other mold half, a second pin carried in said one mold half in longitudinally slidable relation to permit longitudinal movement between first and second positions, said mount being prevented from movement to said outer position when the second pin is in its first position and said mount being permitted to move to its outer position when the second pin is in its second position, and means for biasing said second pin toward its first position, said first pin pushing said second pin into the second position when the mold halves are closed together, and said first pin permitting said second pin to occupy its first position when the mold halves are separated by more than said predetermined distance.

5. The mold of claim 4 in which said first and second pins define free ends that are normally in abutting relation within a transverse aperture defined in said mount.

6. The mold of claim 5 in which said second pin defines a section adjacent its free end which is of less diameter than that of the transverse aperture, said second pin defining a transversely-enlarged shoulder spaced from said free end which fits within said transverse aperture in the first position, to prevent the mount from moving to the outer position, said shoulder being positioned out of said aperture in the second position to permit said mount to move to the outer position.

7. The mold of claim 6 in which said first pin and said transverse aperture define interlocking means to prevent withdrawal of said first pin from said aperture while said mount occupies its outer position, whereby the mold halves are locked together.

8. The mold of claim 7 in which said lifting handle defines noncircular, arcuate, rotatable bearing surface means which acts against said one mold half to cause said mount to be moved to its outer position as the lifting handle rotates to its second, outwardly extending position.

9. In a mold comprising mold halves separable along a parting line, and a lifting handle carried by one said mold halves, said handle being rotatable between a first position in which the handle lies generally flat against the mold and a second position in which the handle extends outwardly from the mold to permit engagement by a lifting member, the improvement comprising, in combination: first means preventing rotation of said lifting handle from the first to the second position when the mold halves are separated along said parting line by more than a predetermined distance, said first means including a mount carried in a recess of said one mold half, said mount rotatably holding said lifting handle, said mount being moveable inwardly and outwardly between an inner and outer position relative to said mold half, said lifting handle defining a noncircular, arcuate, rotatable bearing surface means which acts against said one mold half to cause said mount to be moved to its outer position as the lifting handle rotates to its second, outwardly extending position; second means positioned in a manner controlled by the position of the other mold half, said second means preventing said mount from occupying its outer position when the other mold half is separated from the one mold half, whereby said lifting handle cannot rotate to its second, outwardly extending position when the other mold half is separated from the one mold half.

10. The mold of claim 9 in which said second means includes a first pin secured to said other mold half, a second pin carried in said on mold half in longitudinally slidable relation to permit longitudinal movement between first and second positions, said mount being prevented from movement to said outer position when the second pin is in its first position and said mount being permitted to move to its outer position when the second pin is in its second position, and means for biasing said second pin toward its first position, said first pin pushing said second pin into the second position when the mold halves are closed together, and said first pin permitting said second pin to occupy its first position when the mold halves are separated by more than said predetermined distance.

11. The mold of claim 10 in which said first and second pins are normally in abutting relation within a transverse aperture defined in said mount.

12. The mold of claim 11 in which said second pin defines a section adjacent its free end of less diameter than that of the transverse aperture, said second pin defining a transversely-enlarged shoulder spaced from said free end which fits within said transverse aperture in the first position, to prevent the mount from moving to the outer position, said shoulder being positioned out of said aperture in the second position to permit said mount to move to the outer position.

13. The mold of claim 12 in which said first pin and said transverse aperture define interlocking means to prevent withdrawal of said first pin from said aperture while said mount occupies its outer position, whereby the mold halves are locked together.

14. In a mold comprising mold halves separable along a parting line, and a lifting handle carried by one of said mold halves, said handle being rotatable between a first position in which the handle lies generally flat against the mold and a second position in which the handle extends outwardly from the mold to permit engagement by a lifting member, the improvement comprising, in combination:

first means preventing rotation of said lifting handle from the first to the second position when the mold halves are separated along said parting line by more than a predetermined distance, and added means for preventing opening of the parting line between said mold halves in closed relation when said handle is in the second position; said first means including a mount carried in a recess of said one mold half, said mount rotatably holding said lifting handle, said mount being moveable inwardly and outwardly between an inner and an outer position relative to said one mold half, said lifting handle defining noncircular, arcuate, rotatable bearing surface means which acts against said mold half to cause said mount to be moved to its outer position as the lifting handle rotates to its second, outwardly extending position; and second means positioned in a manner controlled by the position of the other mold half, said second means preventing said mount from occupying its outer position when the other mold half is separated from the one mold half, whereby said lifting handle cannot rotate to its outer position except when the mold halves are substantially closed along their parting line.

15. The mold of claim 14 in which said mount defines a transverse aperture, and a first pin is secured to said other mold half, said first pin and said transverse aperture defining interlocking means to prevent withdrawal of said first pin from said aperture while said mount occupies its outer position, whereby the mold halves are locked together as long as said lifting handle occupies its second, outwardly extending position.

* * * * *